No. 820,796. PATENTED MAY 15, 1906.
A. S. KOCH.
CALIPERS.
APPLICATION FILED MAR. 14, 1906.

WITNESSES:

INVENTOR
Alfred S. Koch
BY
Munn & Co
ATTORNEYS

UNITED STATES PATENT OFFICE.

ALFRED S. KOCH, OF LANCASTER, PENNSYLVANIA.

CALIPERS.

No. 820,796.  Specification of Letters Patent.  Patented May 15, 1906.

Application filed March 14, 1906. Serial No. 306,024.

*To all whom it may concern:*

Be it known that I, ALFRED SAMUEL KOCH, a citizen of the United States, and a resident of Lancaster, in the county of Lancaster and State of Pennsylvania, have invented new and Improved Calipers, of which the following is a full, clear, and exact description.

This invention relates to improvements in calipers of the so-called "figure-eight" class employed by watchmakers in testing balance-wheels and other parts, the object being to provide a caliper of this class with a novel form of pointer and the means for mounting the pointer, whereby it may be readily turned to one end or the other of the caliper and also turned from the plane of the caliper.

I will describe a caliper embodying my invention and then point out the novel features in the appended claims.

Reference is to be had to the accompanying drawings, forming a part of this specification, in which similar characters of reference indicate corresponding parts in all the figures.

Figure 1:
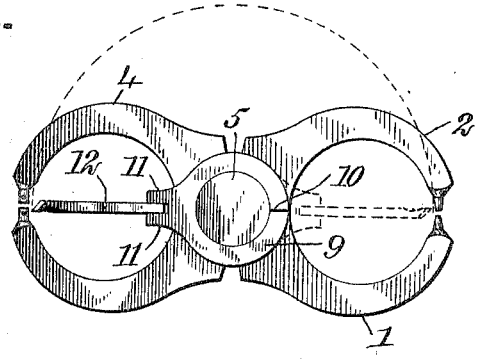
Figure 2:
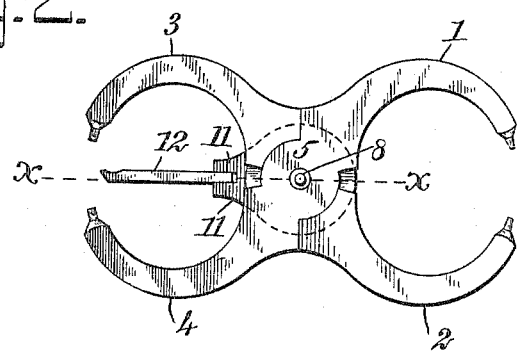
Figure 3:
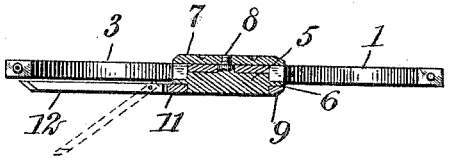

Figure 1 is a top plan view of a caliper embodying my invention. Fig. 2 is a bottom plan thereof, and Fig. 3 is a section on the line *x x* of Fig. 2.

At one end the caliper has the usual bow-shaped members 1 2, and similarly-shaped members 3 4 are at the other end. The arms or members 3 4 are made integral, as are also the arms or members 2 3, and these integral members are crossed and pivotally connected at the center. As here shown the members are mounted to swing on a pivot-block 5, having a flange 6, upon which one side of the members rest, while the other side is engaged by a plate 7, removably secured to the block 5 by means of a screw 8, extended from the block into a tappet perforation in the plate 7. Mounted to rotate on a part of the block projected outward from the flange 6 is a ring 9, which at one side is open, as indicated at 10, so that the ring may be easily sprung over said projection of the block, but held with sufficient friction to prevent its accidental removal. Extended from one side of the ring 9 are lugs 11, and having pivotal connection between the lugs is a pointer 12. The object, of course, in so mounting the pointer is to permit its movement up and down relatively to the plane of the caliper. The ends of the arms or caliper members are provided with the usual devices for engaging with the work to be tested or trued up, the engaging devices at one side being of course different from the engaging devices at the other end.

Having thus described my invention, I claim as new and desire to secure by Letters Patent—

1. A caliper having arms at its opposite ends, the arm at one end being integral with the opposite arm at the other end, a pivot-block having a flange upon which the upper surfaces of the arm members at the pivotal point engage, a plate detachably connected to said block and engaging upon the outer sides of said arm members at the pivotal point, said block having a projection outward from its flange, a spring-ring mounted to rotate on said projection, and a pointer having swinging connection with the ring.

2. A caliper comprising crossed members, a pivot-block on which the members are mounted to swing, a flange on said block for engaging with one side of said members, a plate removably attached to the block, for engaging with the other side of said members, a ring having swinging connection with said block, lugs extended from one side of the ring, and a pointer mounted between said lugs, so as to have a swinging movement toward and from the plane of the caliper.

3. The combination with caliper-arms of a pivot-block for the arms, the said pivot-block having an outward projection, a ring mounted to rotate on said projection, the said ring being open at one side whereby it may be sprung over the projection, and for frictional engagement therewith, and a pointer mounted to swing on the ring.

In testimony whereof I have signed my name to this specification in the presence of two subscribing witnesses.

ALFRED S. KOCH.

Witnesses:
 S. B. MOORE,
 LEONARD L. LEWIS.